US008493690B1

(12) United States Patent
Ono et al.

(10) Patent No.: US 8,493,690 B1
(45) Date of Patent: Jul. 23, 2013

(54) LOAD-UNLOAD RAMP STRUCTURE WITH CANTILEVERED FIN PORTION CONFIGURED TO REDUCE DROP SHOCK IN A HARD-DISK DRIVE

(75) Inventors: Makoto Ono, Kanagawa (JP); Masakazu Sasaki, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/340,586

(22) Filed: Dec. 29, 2011

(51) Int. Cl.
*G11B 5/54* (2006.01)

(52) U.S. Cl.
USPC ..................................... 360/254.8

(58) Field of Classification Search
USPC ............ 360/254.7, 254.8, 255.6, 255.7, 254.4
See application file for complete search history.

(56) References Cited

U.S. PATENT DOCUMENTS

| | | | | |
|---|---|---|---|---|
| 6,078,474 A * | 6/2000 | Koyanagi et al. | ............ | 360/254.8 |
| 6,639,758 B2 * | 10/2003 | Ohta et al. | .................. | 360/254.8 |
| 6,747,843 B2 * | 6/2004 | Sharma et al. | ................. | 360/128 |
| 7,016,150 B2 * | 3/2006 | Hahm et al. | ................... | 360/128 |
| 7,230,800 B2 | 6/2007 | Hirano et al. | | |
| 7,474,509 B2 * | 1/2009 | Antoku | ....................... | 360/254.8 |
| 7,697,238 B2 | 4/2010 | Makoto et al. | | |
| 7,768,745 B2 * | 8/2010 | Okada et al. | ................ | 360/254.8 |
| 7,813,078 B1 * | 10/2010 | Gleason et al. | ............ | 360/97.13 |
| 7,986,496 B2 * | 7/2011 | Ohta et al. | .................. | 360/254.8 |
| 8,169,747 B2 * | 5/2012 | Seki et al. | ..................... | 360/254.8 |
| 8,203,806 B2 * | 6/2012 | Larson et al. | ............... | 360/254.9 |
| 2001/0043441 A1 * | 11/2001 | Kishi et al. | ................... | 360/254.8 |
| 2005/0018354 A1 * | 1/2005 | Takahashi | ................... | 360/254.8 |
| 2005/0237671 A1 * | 10/2005 | Nguyen | ..................... | 360/254.4 |
| 2005/0280945 A1 * | 12/2005 | Duvall et al. | ............... | 360/254.7 |
| 2006/0132980 A1 * | 6/2006 | Kim et al. | .................... | 360/254.8 |
| 2006/0139796 A1 | 6/2006 | Kanada et al. | | |
| 2006/0256478 A1 | 11/2006 | Hayakawa | | |
| 2006/0262448 A1 * | 11/2006 | Okada et al. | ..................... | 360/69 |
| 2008/0037176 A1 * | 2/2008 | Matsuda et al. | ........... | 360/254.8 |
| 2008/0204925 A1 | 8/2008 | Ohta et al. | | |
| 2008/0285175 A1 * | 11/2008 | Okutomi et al. | ........... | 360/254.8 |
| 2008/0285176 A1 * | 11/2008 | Arikawa | .................... | 360/254.8 |
| 2010/0061012 A1 | 3/2010 | Seki et al. | | |

* cited by examiner

*Primary Examiner* — Brian Miller

(57) ABSTRACT

A load-unload ramp structure with a cantilevered fin portion to reduce drop shock in a hard-disk drive (HDD). The load-unload ramp structure includes a first load-unload ramp, a fin, and a bracket portion. The first load-unload ramp is configured to lift a first head-slider away from a magnetic-recording disk. The fin is coupled to the first load-unload ramp and is disposed below a first parking position of the first head-slider. The fin includes a fin base portion and a first cantilevered fin portion. The first cantilevered fin portion is coupled to, and extends outward from, the fin base portion. The bracket portion is integrally attached to the first load-unload ramp, and is configured to allow affixing the load-unload ramp structure in a static position in a disk-enclosure base of the HDD. A HDD including the load-unload ramp structure and a method for providing protection from drop shock are also provided.

17 Claims, 10 Drawing Sheets

800

```
┌─────────────────────────────────────────────────────────────────┐
│ FABRICATE A LOAD-UNLOAD RAMP STRUCTURE INCLUDING A FIN HAVING A SLIT, │
│ THE FIN INCLUDING A FIRST CANTILEVERED FIN PORTION AND A SECOND │
│ CANTILEVERED FIN PORTION DEFINED BY THE SLIT IN THE FIN          │
│ 810                                                              │
└─────────────────────────────────────────────────────────────────┘
                              ↓
┌─────────────────────────────────────────────────────────────────┐
│ AFFIX A BRACKET PORTION OF THE LOAD/UNLOAD RAMP STRUCTURE TO AFFIX │
│ THE LOAD/UNLOAD RAMP STRUCTURE IN A STATIC POSITION IN A DISK-   │
│ ENCLOSURE BASE OF A HARD-DISK DRIVE                              │
│ 820                                                              │
└─────────────────────────────────────────────────────────────────┘
                              ↓
┌─────────────────────────────────────────────────────────────────┐
│ PARK A HEAD-GIMBAL ASSEMBLY INCLUDING A HEAD-SLIDER OF THE HARD-DISK │
│ DRIVE AT A PARKING POSITION ON THE LOAD-UNLOAD RAMP STRUCTURE,   │
│ WHEREIN THE PARKING POSITION IS LOCATED ADJACENT TO THE FIRST AND │
│ SECOND CANTILEVERED FIN PORTIONS SUCH THAT THE HEAD-SLIDER FACES AT │
│ LEAST ONE OF THE FIRST AND SECOND CANTILEVERED FIN PORTIONS WHEN THE │
│ HEAD-GIMBAL ASSEMBLY IS PARKED AT THE PARKING POSITION           │
│ 830                                                              │
└─────────────────────────────────────────────────────────────────┘
                              ↓
┌─────────────────────────────────────────────────────────────────┐
│ WHEREIN FABRICATING THE LOAD-UNLOAD RAMP STRUCTURE MAY FURTHER   │
│ INCUDE INJECTION MOLDING THE LOAD-UNLOAD RAMP STRUCTURE WITH A DIE │
│ THAT INCLUDES A PROTRUSION INTO A CAVITY FORMED BY THE DIE TO PRODUCE │
│ THE SLIT IN THE FIN AT A LOCATION OF THE PROTRUSION WHEN THE LOAD- │
│ UNLOAD RAMP STRUCTURE IS FORMED IN THE DIE                       │
│ 840                                                              │
└─────────────────────────────────────────────────────────────────┘
```

LOAD-UNLOAD RAMP STRUCTURE WITH CANTILEVERED FIN PORTION CONFIGURED TO REDUCE DROP SHOCK IN A HARD-DISK DRIVE

TECHNICAL FIELD

Embodiments of the present invention relate generally to the field of hard-disk drives (HDDs), and protecting a HDD from the shock of dropping a HDD.

BACKGROUND

With the advance of HDD technology, the spacing between a magnetic-recording head and a magnetic-recording disk has become progressively smaller, on the order of a few nanometers (nm). Consequently, small changes in the dimensional tolerances of internal components that can affect the head-to-disk spacing, or fly-height, have become of greater concern. For example, dropping an HDD can give rise to head-positioning errors, and cause errors in the recording, or retrieval, of information stored on the magnetic-recording disk. Thus, engineers and scientists engaged in the development of HDDs are becoming increasingly more interested in providing a HDD more robust in protecting against the shock of dropping the HDD, and HDD designs that can achieve such robustness with minimal impact on cost.

SUMMARY

Embodiments of the present invention include a load-unload (L/UL) ramp structure with a cantilevered fin portion to reduce drop shock in a hard-disk drive (HDD). The L/UL ramp structure includes a first L/UL ramp, a fin, and a bracket portion. The first L/UL ramp is configured to lift a first head-slider away from a first recording surface of a magnetic-recording disk. The fin is coupled to the first L/UL ramp and is disposed below a first parking position of the first head-slider on the first L/UL ramp. The fin includes a fin base portion and a first cantilevered fin portion. The first cantilevered fin portion is coupled to, and extends outward from, the fin base portion. The bracket portion is integrally attached to the first L/UL ramp, and is configured to allow affixing the L/UL ramp structure in a static position in a disk-enclosure base of the HDD. Embodiments of the present invention also include a HDD including the L/UL ramp structure with a cantilevered fin portion to reduce drop shock, and a method for providing protection from drop shock for at least one head-slider in a HDD

DESCRIPTION OF THE DRAWINGS

The accompanying drawings, which are incorporated in and form a part of this specification, illustrate embodiments of the invention and, together with the description, serve to explain the embodiments of the invention:

FIG. 8 is flow chart illustrating a method for providing protection from drop shock for at least one head-slider in the HDD, in accordance with one or more embodiments of the present invention.

Figure 1:
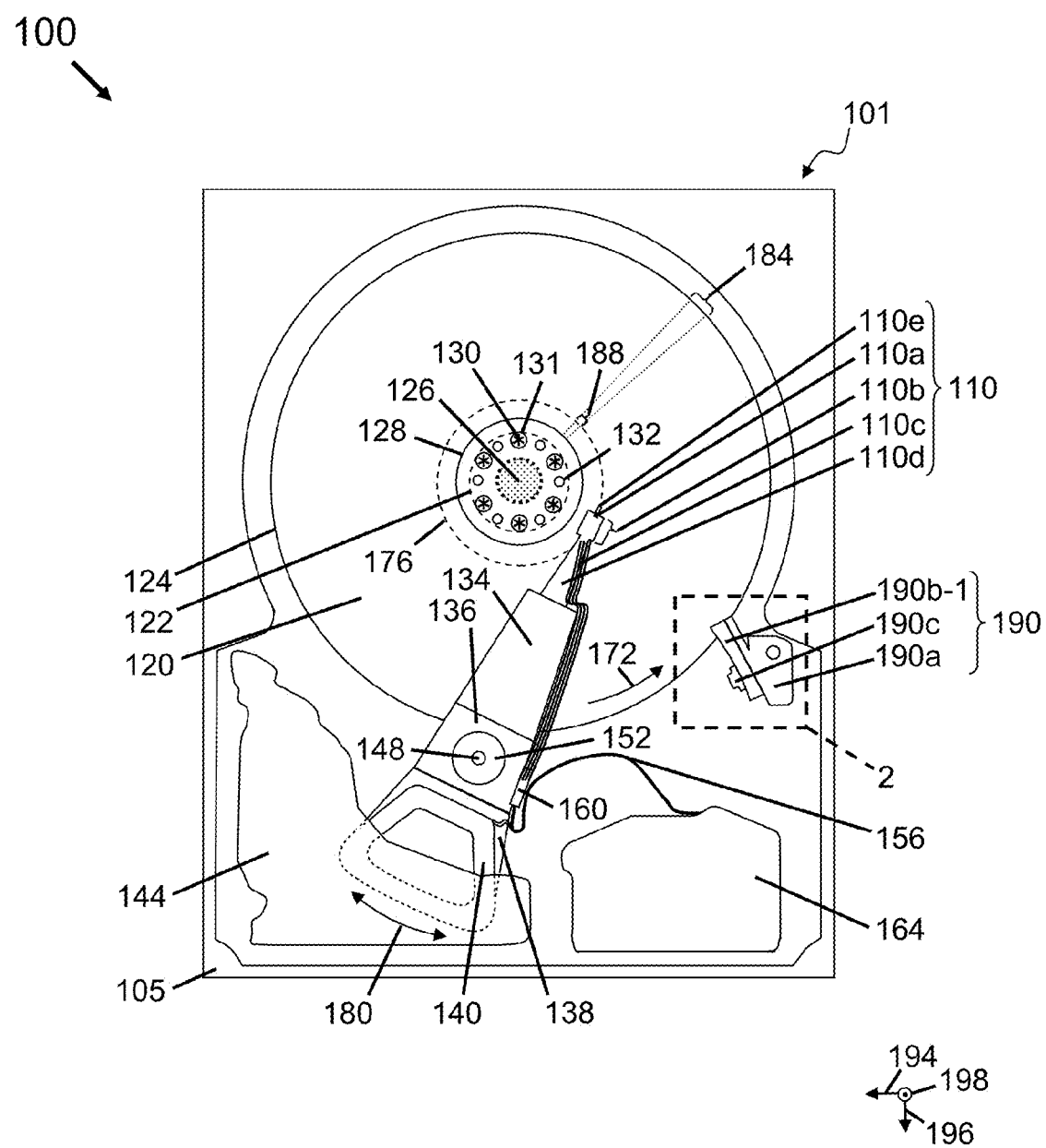
FIG. 1 is a plan view illustrating the arrangement of components within the example environment of a hard-disk drive (HDD) that includes a load-unload (L/UL) ramp structure with a cantilevered fin portion to reduce drop shock, in accordance with one or more embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be appreciated that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Physical Description of Embodiments of a Load-Unload (L/UL) Ramp Structure with Cantilevered Fin Portion Configured to Reduce Drop Shock in a Hard-Disk Drive (HDD), a HDD Including the Same, and a Method for Providing Protection Against Drop Shock to a Head-Slider in the HDD Embodiments of the present invention relate to the ability of a hard-disk drive (HDD) to withstand external impacts, and relate, in particular, to the ability of a HDD to withstand external impacts when it is not operating. In recent years, HDDs have come to be used not only in information-technology (IT) equipment such as personal computers (PCs), but have also come to be widely used in household appliances, such as televisions and digital video recorders (DVRs). Thus, HDDs, because of the ubiquitous use, have to withstand external impacts. In HDDs, a magnetic-recording head writes data to and reads data from a magnetic-recording medium of a magnetic-recording disk by means of the magnetic-recording head. The magnetic-recording head is formed within a head-slider, and the head-slider that is attached to elastic suspension by way of a flexure.

When an HDD is operating, the head-slider flies above the rotating magnetic-recording disk with a surface of the magnetic-recording head facing the magnetic-recording medium of the magnetic-recording disk, referred to by the term of art, "air bearing surface (ABS)," of the magnetic-recording head; and, a constant gap, referred to by the term of art, "fly-height (FH)," is maintained between the ABS of the magnetic-recording head and the recording surface of the magnetic-recording disk. A suspension is attached to a rotary actuator; and, when the actuator is driven, the magnetic-recording head is held at a prescribed position over the magnetic-recording disk so that data can be written and read. The magnetic-recording disk is rotated within angular rotation of 5400 revolutions per minute (rpm), or alternatively 7200 rpm depending upon the design of the HDD, by means of a spindle motor.

Embodiments of the present invention relate to a load/unload (L/UL) ramp structure which is used in the HDD. Embodiments of the present invention are intended to ensure that the HDD is able to withstand external impacts, when it is not operating, by providing suitable stiffness for a fin that is a component part of the L/UL ramp structure facing the ABS side of the head-slider when the magnetic-recording head is retracted from the magnetic-recording disk, and parked in a parking position of the L/UL ramp structure.

As shown in and described in the discussion of FIGS. 1-8 herein, embodiments of the present invention include a L/UL ramp structure 190 with a cantilevered fin portion, for example, at least one of first and second cantilevered fin portions 190c-1b and 190c-2b, to reduce drop shock in a hard-disk drive (HDD) 101. The L/UL ramp structure 190 includes a first L/UL ramp 190b-1, a fin 190c, and a bracket portion 190a. The first L/UL ramp 190b-1 is configured to lift a first head-slider 110a and 110b away from a first recording surface of a magnetic-recording disk 120. The fin 190c is coupled to the first L/UL ramp 190b-1 and is disposed below a first parking position of the first head-slider 110a and 110b on the first L/UL ramp 190b-1. The fin 190c includes a fin base portion, including a top fin base portion 190c-1a and a bottom fin base portion 190c-2a (see FIGS. 3 and 5A-5C), and a first cantilevered fin portion 190c-1b. The first cantilevered fin portion 190c-1b is coupled to, and extends outward from, the fin base portion 190c-1a and 190c-2a. The bracket portion 190a is integrally attached to the first L/UL ramp 190b-1, and is configured to allow affixing the L/UL ramp structure 190 in a static position in a disk-enclosure base 105 of the HDD 101.

Figure 2:
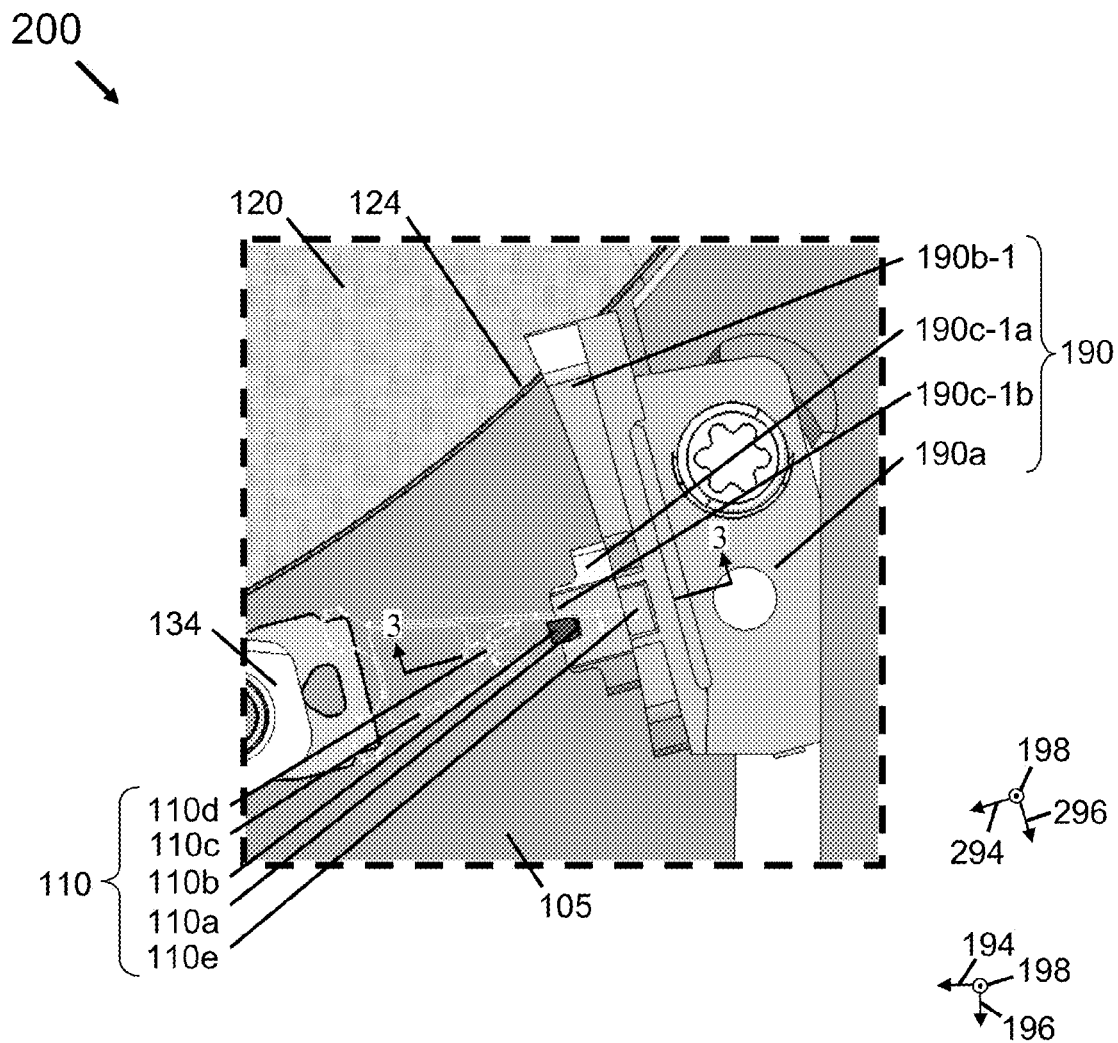
FIG. 2 is an enlarged plan view of the boxed region 2 of FIG. 1 illustrating details of the configuration of a cantilevered fin portion of the L/UL ramp structure of FIG. 1 with respect to a head-slider when the head-slider is parked at a parking position above the cantilevered fin portion, in accordance with one or more embodiments of the present invention.
Figure 3:
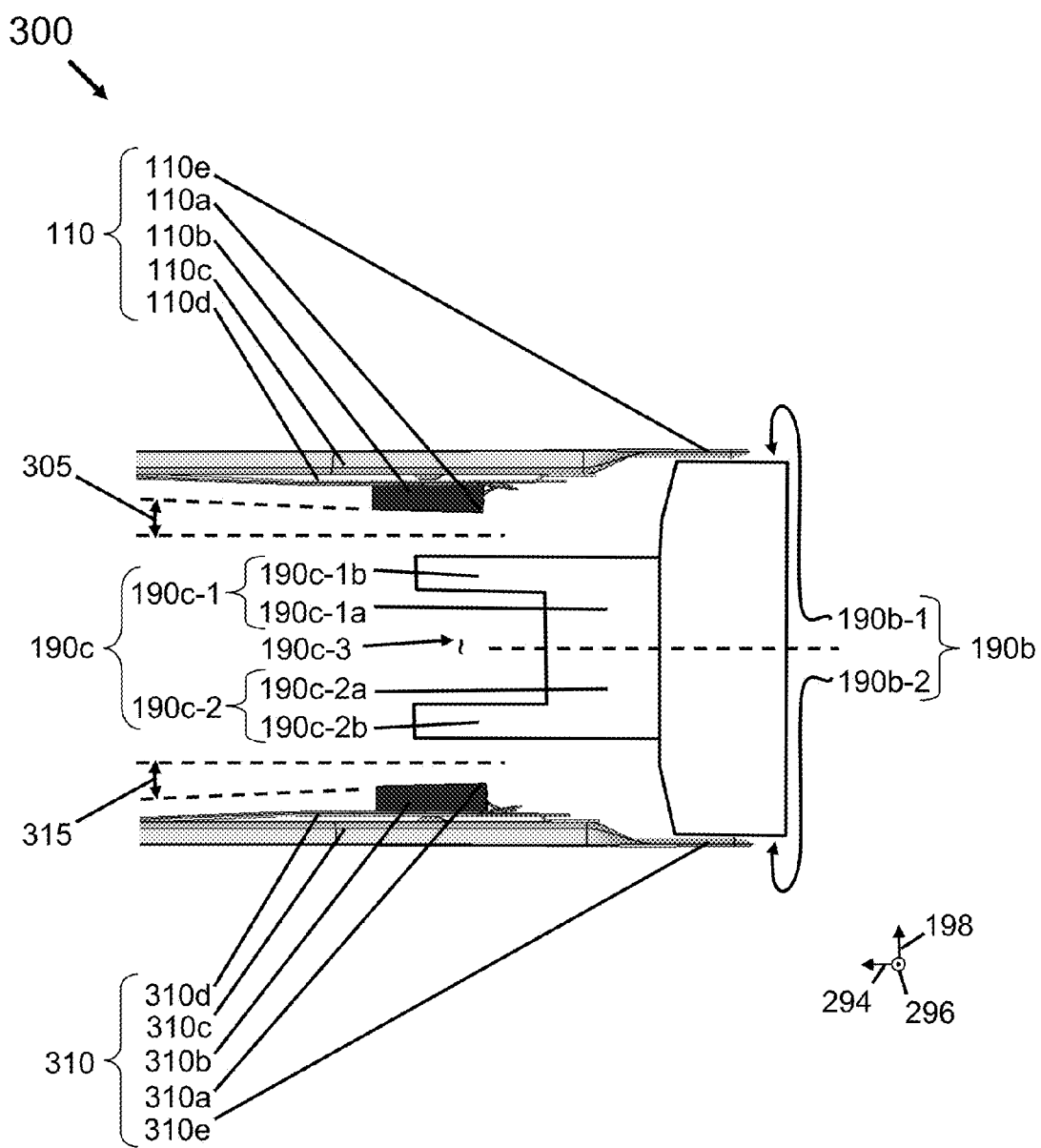
FIG. 3 is side view of the head-gimbal assemblies and a cross-sectional view of a cross-section along line 3-3 of FIG. 2 of the L/UL ramp structure illustrating the configuration of cantilevered fin portions of the L/UL ramp structure of FIG. 1 with respect to head-sliders parked at respective parking positions of a pair of head-gimbal assemblies (HGAs) configured to access opposite sides of a magnetic-recording disk, in accordance with one or more embodiments of the present invention.

As shown in and described in the discussion of FIGS. 1-3 herein, embodiments of the present invention also include a HDD 101 including the L/UL ramp structure 190 with the cantilevered fin portion, for example, first cantilevered fin portion 190c-1b (see FIGS. 2-3 and 5A-5C), to reduce drop shock. Throughout the following, the embodiments of the present invention for the L/UL ramp structure 190 with a cantilevered fin portion, for example, at least one of first and second cantilevered fin portions 190c-1b and 190c-2b, to reduce drop shock in a HDD may be understood to be also incorporated in the environment of HDD 101.

Furthermore, as shown in and described in the discussion of FIG. 8 herein, embodiments of the present invention also include a method for providing protection from drop shock for at least one head-slider in a HDD. Throughout the following, embodiments of the present invention for the L/UL ramp structure with a cantilevered fin portion, for example, at least one of first and second cantilevered fin portions 190c-1b and 190c-2b of FIGS. 1-3 and 5A-5C, to reduce drop shock in a HDD and embodiments of the present invention for the HDD including the L/UL ramp structure with the cantilevered fin portion to reduce drop shock in the HDD may be understood as being capable of being incorporated within certain embodiments of the present invention for the method for providing protection from drop shock for at least one head-slider in a HDD.

With reference now to FIG. 1, in accordance with one or more embodiments of the present invention, a plan view 100 of a hard-disk drive (HDD) 101 is shown. FIG. 1 illustrates the arrangement of components within HDD 101 that includes a L/UL ramp structure 190 with fin 190c including a first cantilevered fin portion 190c-1b (see FIGS. 2-3 and 5A-5C) to reduce drop shock. HDD 101 includes, without limitation thereto, at least one, a first, head-gimbal assembly (HGA) 110 including a first magnetic-recording head 110a, a first lead-suspension 110c attached to the first magnetic-recording head 110a, and a first load beam 110d attached to a first head-slider 110a and 110b, which includes the first magnetic-recording head 110a at a distal end of a first slider 110b. As used herein, the term of art, "head-slider," refers to the combination of a magnetic-recording head and a slider, for example, first magnetic-recording head 110a and first slider 110b. In an alternative embodiment of the present invention, HDD 101 may include more than one HGA, for example, a second HGA 310 as shown in FIG. 3, which faces first HGA 110 when disposed in a parking position on L/UL ramp structure 190. The first head-slider 110a and 110b is attached at the distal end of the first load beam 110b to a gimbal portion of the first load beam 110b. The first HGA 110 also includes a first tongue portion 110e, which allows first HGA 110 to engage the first L/UL ramp 190b-1 when the first HGA 110 is retracted from the first recording surface of the magnetic recording disk 120. HDD 101 also includes at least one magnetic-recording disk 120 rotatably mounted on a spindle 126 and a drive motor (not shown) mounted in a disk-enclosure base 105 and attached to the spindle 126 for rotating the magnetic-recording disk 120. The first magnetic-recording head 110a that includes a write element, a so-called writer, and a read element, a so-called reader, is disposed for respectively writing and reading information, referred to by the term of art, "data," stored on the magnetic-recording disk 120 of HDD 101. The magnetic-recording disk 120, or a plurality (not shown) of magnetic-recording disks, may be affixed to the spindle 126 with a disk clamp 128. The disk clamp 128 is provided with fastener holes, for example, fastener hole 130, and clamps the magnetic-recording disk 120, or magnetic recording disks (not shown), to a hub (not shown) with fasteners, of which fastener 131 is an example. HDD 101 further includes an arm 134 attached to first HGA 110, a carriage 136, a voice-coil motor (VCM) that includes an armature 138 including a voice coil 140 attached to the carriage 136; and a stator 144 including a voice-coil magnet (not shown); the armature 138 of the VCM is attached to the carriage 136 and is configured to move the arm 134 and first HGA 110 to access portions of the magnetic-recording disk 120, as the carriage 136 is mounted on a pivot-shaft 148 with an interposed pivot-bearing assembly 152.

With further reference to FIG. 1, in accordance with one or more embodiments of the present invention, electrical signals, for example, current to the voice coil 140 of the VCM, write signals to and read signals from the first magnetic-recording head 110a, are provided by a flexible cable 156. Interconnection between the flexible cable 156 and the first magnetic-recording head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by the disk-enclosure base 105. The disk-enclosure base 105, also referred to as a base casting, depending upon whether the disk-enclosure base 105 is cast, in conjunction with an HDD cover (not shown) provides a sealed protective disk enclosure for the information storage components of HDD 101.

With further reference to FIG. 1, in accordance with one or more embodiments of the present invention, other electronic components (not shown), including a disk controller and servo electronics including a digital-signal processor (DSP), provide electrical signals to the drive motor, the voice coil 140 of the VCM and the first magnetic-recording head 110a of first HGA 110. The electrical signal provided to the drive motor enables the drive motor to spin providing a torque to the spindle 126 which is in turn transmitted to the magnetic-recording disk 120 that is affixed to the spindle 126 by the disk clamp 128; as a result, the magnetic-recording disk 120 spins in a direction 172. The spinning magnetic-recording disk 120 creates an airflow including an air-stream, and a self-acting air bearing on which the air-bearing surface (ABS) of the first head-slider 110a and 110b rides so that the first head-slider 110a and 110b flies in proximity with the first recording surface of the magnetic-recording disk 120 to avoid contact with a thin magnetic-recording medium of the magnetic-recording disk 120 in which information is recorded. The electrical signal provided to the voice coil 140 of the VCM enables the first magnetic-recording head 110a of first HGA 110 to access a track 176 on which information is recorded. As used herein, "access" is a term of art that refers to operations in seeking the track 176 of the magnetic-recording disk 120 and positioning the first magnetic-recording head 110a on the track 176 for both reading data from, and writing data to, the magnetic-recording disk 120. The armature 138 of the VCM swings through an arc 180 which enables first HGA 110 attached to the armature 138 by the arm 134 to access various tracks on the magnetic-recording disk 120. Information is stored on the magnetic-recording disk 120 in a plurality of concentric tracks (not shown) arranged in sectors on the magnetic-recording disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the first magnetic-recording head 110a of first HGA 110 reads the servo-burst-signal pattern which provides a position-error-signal (PES) to the servo electronics, which controls the electrical signal provided to the voice coil 140 of the VCM, enabling the first magnetic-recording head 110a to follow the track 176. Upon finding the track 176 and identifying a particular sectored track portion 188, the first magnetic-recording head 110a either reads data from the track 176, or writes data to, the track 176 depending on instructions received by the disk controller from an external agent, for example, a microprocessor of a computer system.

As used herein, component parts of HDD 101 have different sides referred to by at least the following terms of art: a side facing an inside diameter (ID) of a magnetic-recording disk, for example, similar to the magnetic-recording disk 120, referred to herein as an ID side, which is applicable to component parts situated between the ID and outside diameter of the magnetic-recording disk; a side facing an outside diameter (OD) of the magnetic-recording disk, an OD side, which likewise is applicable to component parts situated between the ID and OD of the magnetic-recording disk; for example, the magnetic recording disk 120 has an ID side 122 and an OD side 124; a side facing into the direction 172 of motion of the magnetic-recording disk and, thus, into the direction of airflow, a leading-edge (LE) side; a side facing away from the direction 172 of motion of the magnetic-recording disk and, thus, away from the direction of airflow, a trailing-edge (TE) side; a side, or portion, of a component facing towards the bottom of the disk-enclosure base 105, a bottom side, or bottom portion, respectively; a side, or portion, of a component facing away from the bottom of the disk-enclosure base 105 and, thus, towards the disk-enclosure cover (not shown), a top side, or top portion, respectively; a side, or portion, of a component facing the recording surface of the magnetic-recording disk, a disk-facing side, or disk-facing portion, respectively; and, a side, or portion, of a component facing away from and opposite to a side facing the recording surface of the magnetic-recording disk, an opposite-to-disk-facing side, or opposite-to-disk-facing portion, respectively.

As shown in FIG. 1, a triad of arrows 194, 196 and 198 is used to indicate the relative orientation of components in HDD 101; the direction of arrow 196 is about parallel to the long side of the disk-enclosure base 105 of HDD 101; the direction of arrow 194 is perpendicular to arrow 196 and is about parallel to the short side of the disk-enclosure base 105 of HDD 101; and, arrow 198, which is indicated by the arrow head of arrow 198, is about perpendicular to the plane of the disk-enclosure base 105, as well as the plane of the first recording surface of the magnetic recording disk 120, and therefore is perpendicular to arrows 194 and 196. Thus, the triad of arrows 194, 196 and 198 are related to one another by the right-hand rule for vectors in the direction of the arrows 194, 196 and 198 such that the cross product of the vector corresponding to arrow 194 and the vector corresponding to arrow 196 produces a vector parallel and oriented in the direction of the arrow 198. The triad of arrows 194, 196 and 198 is subsequently used to indicate the orientation of views for subsequently described drawings of the L/UL ramp structure 190, of which FIG. 2, which shows an enlarged view of box 2 of FIG. 1, is an example that is next described.

With reference now to FIG. 2, in accordance with one or more embodiments of the present invention, an enlarged plan view 200 of the boxed region 2 of FIG. 1 is shown. FIG. 2 shows details of the configuration of the cantilevered fin portion 190c-1b of the L/UL ramp structure 190 of FIG. 1 with respect to a first head-slider 110a and 110b when the first head-slider 110a and 110b is parked at a parking position above the cantilevered fin portion 190c-1b. As shown in FIG. 2, the triad of arrows 194, 196 and 198 indicates the orientation in which the L/UL ramp structure 190 is viewed in the plan view 200 relative to the plan view 100 of FIG. 1. In accordance with one or more embodiments of the present invention, the first cantilevered fin portion 190c-1b is configured so that when the first head-slider 110a and 110b is parked at the first parking position the first cantilevered fin portion 190c-1b is disposed facing a disk-facing side of the first head-slider 110a and 110b. As shown in FIG. 2, the top fin portion 190c-1 (see FIGS. 3 and 5A-5C) of fin 190c includes the top fin base portion 190c-1a and the first cantilevered fin portion 190c-1b, which by way of example is a top cantilevered fin portion, without limitation thereto. When HDD 101 is not operating, the first magnetic-recording head 110a is retracted onto a first L/UL ramp 190b-1, by way of example, a top L/UL ramp, without limitation thereto, positioned away from the OD side 124 of the magnetic-recording disk 120. This is done so that if there is an impact when HDD 101 is not operating, the first head-slider 110a and 110b is prevented from jumping over the magnetic-recording disk 120, and the reaction thereof causing the first head-slider 110a and 110b to strike the magnetic-recording disk 120, a phenomenon which is referred to by the term of art, "head slap," thereby scratching the first recording surface of the magnetic-recording disk 120, where data is recorded. The L/UL ramp portion 190b is provided with a fin 190c, and is designed so that the facing head-sliders, which by way of example are the first head-slider 110a and 110b and a second head-slider 310a and 310b (see FIG. 3), above and below the fin 190c do not directly touch each other. This is because head slap also occurs on the L/UL ramp portion 190b due to impacts when HDD 101 is not operating; and, therefore, there is a risk of such impacts damaging the head-sliders if there is no fin 190c.

With further reference to FIG. 2 and reference to FIGS. 3 and 5A-5C, in accordance with one or more embodiments of the present invention, a second triad of arrows 294, 296 and 198 is shown that indicates the orientation of the bracket portion 190a relative to the airflow direction above the magnetic-recording disk 120 in HDD 101. As shown in FIG. 2, the direction of arrow 296 is about parallel to the LE side of the bracket portion 190a of the L/UL ramp portion 190b; the direction of arrow 294 is perpendicular to arrow 296 and is perpendicular to the LE side of the bracket portion 190a of the L/UL ramp portion 190b; and, the arrow 198, which is indicated by the arrow head of arrow 198, is about perpendicular to the plane of the disk-enclosure base 105, as well as the plane of the first recording surface of the magnetic recording disk 120, as previously described, and is also perpendicular to arrows 294 and 296. The second triad of arrows 294, 296 and 198 is useful for indicating the orientation of component parts of the L/UL ramp structure 190 shown in FIG. 2, as well as views for the subsequently described drawings of the L/UL ramp structure 190 that are shown in FIGS. 3 and 5A-5C.

With reference now to FIG. 3, in accordance with one or more embodiments of the present invention, a combined side and cross-sectional view 300 is shown of the first and second HGAs 110 and 310 and a cross-section along line 3-3 of FIG. 2 of the L/UL ramp structure 190, respectively. FIG. 3 shows the configuration of first and second cantilevered fin portions 190c-1b and 190c-2b of the L/UL ramp structure 190 of FIG. 1 with respect to the first head-slider 110a and 110b, and a second head-slider 310a and 310b, respectively, parked at respective parking positions of the pair of first and second HGAs 110 and 310 that are configured to access opposite sides of the magnetic-recording disk 120. As shown in FIG. 3, the triad of arrows 294, 296 and 198 indicates the orientation in which the L/UL ramp structure 190 is viewed in the combined side and cross-sectional view 300 relative to the plan view 200 of FIG. 2. As shown in FIG. 3, in accordance with one or more embodiments of the present invention, the second HGA 310 includes a second magnetic-recording head 310a, a second lead-suspension 310c attached to the second magnetic-recording head 310a, and a second load beam 310d attached to a second head-slider 310a and 310b, which includes the second magnetic-recording head 310a at a distal end of a second slider 310b. The second head-slider 310a and 310b is attached at the distal end of the second load beam 310d to a gimbal portion of the second load beam 310d. The second HGA 310 also includes a second tongue portion 310e, which allows second HGA 310 to engage a second L/UL ramp 190b-2 when the second HGA 310 is retracted from the bottom, or second, recording surface of the magnetic recording disk 120. As shown in FIG. 3, the fin 190c includes a first, or top, fin base portion 190c-1a, a first, or top, cantilevered fin portion 190c-1b, a second, or bottom, fin base portion 190c-2a, and a second, or bottom, cantilevered fin portion 190c-2b. The fin base portion includes the first, or top, fin portion 190c-1, and the second, or bottom, fin portion 190c-2. The fin 190c is provided with a slit 190c-3 that defines the first cantilevered fin portion 190c-1b and the second cantilevered fin portion 190c-2b. Thus, in accordance with embodiments of the present invention, the stiffness of the fin 190c is reduced in comparison with a fin without the slit 190c-3. Also, as shown in FIG. 3, the L/UL ramp portion 190b includes a first, or top, L/UL ramp 190b-1, and a second, or bottom, L/UL ramp 190b-2. As shown in FIG. 3, the first HGA 110 and the second HGA 310 are positioned at their respective parking positions on the first, or top, L/UL ramp 190b-1, and the second, or bottom, L/UL ramp 190b-2, respectively. The first, or top, L/UL ramp 190b-1 and the second, or bottom, L/UL ramp 190b-2 are shown, respectively, with their first and second tongue portions 110e and 310e at the parking positions on respective first and second L/UL ramps 190b-1 and 190b-2.

With further reference to FIG. 3, in accordance with one or more embodiments of the present invention, the first cantilevered fin portion 190c-1b is configured so that when the first head-slider 110a and 110b is parked at the first parking position the first cantilevered fin portion 190c-1b is configured to prevent the first head-slider 110a and 110b and a second head-slider 310a and 310b from striking one another. In accordance with one or more embodiments of the present invention, the second cantilevered fin portion 190c-2b is configured so that when a second head-slider 310a and 310b is parked at the second parking position the second cantilevered fin portion 190c-2b is disposed facing a disk-facing side of the second head-slider 310a and 310b. In accordance with one or more embodiments of the present invention, the second cantilevered fin portion 190c-2b is configured so that when the second head-slider 310a and 310b is parked at the second parking position the second cantilevered fin portion 190c-2b is configured to prevent the first head-slider 110a and 110b and the second head-slider 310a and 310b from striking one another.

With further reference to FIG. 3, in accordance with one or more embodiments of the present invention, with respect to pitch static angle (PSA) 305 and hard errors, the first head-slider 110a and 110b is attached to the suspension by way of the flexure. The flexure is a thin, flexible leaf spring, and has the role of holding the first head-slider 110a and 110b at the correct flying position when HDD 101 is operating. In order to maintain the correct FH, the tilt of the first head-slider 110a and 110b in the lengthwise direction of the suspension, in other words the PSA 305, has to be kept within a specific range. If the PSA 305 has a value greater than a value within the specific range, the PSA is said to have a change in PSA, ΔPSA, greater than the operational PSA. If the PSA 305 has a value less than a value within the specific range, the PSA is said to have a change in PSA, ΔPSA, less than the operational PSA. If an excessive external impact is received when HDD 101 is not operating, the first head-slider 110a and 110b may be strongly affected by head slap, and the flexure may plastically deform. This deformation may be observed as the amount of change in the PSA, ΔPSA. If the deformation of the flexure produces a large change in the PSA, ΔPSA, the first head-slider 110a and 110b may no longer be able to fly stably above the first recording surface of the magnetic-recording disk 120 when HDD 101 is operating. As a result, irreparable errors, referred to by the term of art, "hard errors," may occur when data is written and/or read. Similar arguments also apply to PSA 315 of the second head-slider 310a and 310b of the second HGA 310. A test used to measure the susceptibility of a HDD to the occurrence of such hard errors is next described.

Figure 4:
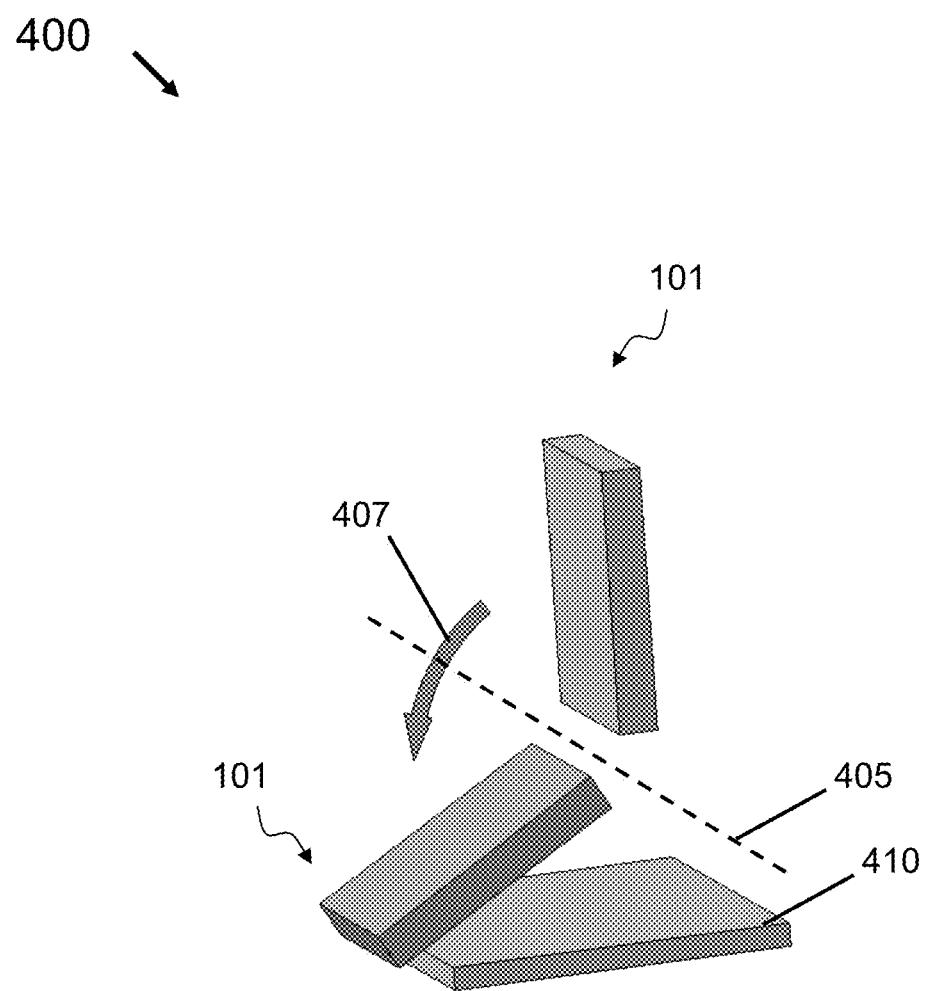
FIG. 4 is a perspective view illustrating the configuration of the HDD of FIG. 1 in a tilt-drop test used to test the HDD for robustness with respect to shock from dropping the HDD, in accordance with one or more embodiments of the present invention.

With reference now to FIG. 4, in accordance with one or more embodiments of the present invention, a perspective view 400 is shown of the configuration of HDD 101 of FIG. 1 in a tilt-drop test used to test the HDD 101 for robustness with respect to shock from dropping HDD 101. A test known as the tilt-drop test is used as a test for confirming the resistance of a non-operating HDD, for example HDD 101, to impacts. In the tilt-drop test, one of the short sides of HDD 101 is disposed parallel to a rotational axis 405 of a test jig (not shown), and, the main body of HDD 101 is rotated and raised from a reference surface 410 to a specific position, from where HDD 101 is allowed to drop naturally and strike the reference surface 410. The reference surface 410 is made of a specific wooden material. In the tilt-drop test, the short side of a single HDD where the rotational axis is located is changed; and, the HDD is dropped once for each side, making a total of four tests. After the tilt-drop test has been performed, a data reading/writing test is carried out using HDD 101, which has been dropped. This data reading/writing test requires that no irreparable errors, "hard errors," have occurred. The tilt-drop test may be performed on a plurality of HDDs; and, the passing the test consists in no hard errors occurring in any of the HDDs. That is, even if one hard error has occurred in only one HDD, this is counted as a failure of the tilt-drop test by the HDD. The tilt-drop test has the most stringent conditions of any test for external impact during non-operation. Head slap occurs due to the impact in the test; and, the first head-slider 110a and 110b jumps on the top, or first, L/UL ramp 190b-1 and strikes the fin 190c. If the flexure deforms excessively at this point and undergoes plastic deformation, the PSA goes beyond the permitted range, and hard errors occur.

With respect to the relationship with FH, in recent compact HDDs, the FH has continued to decrease as the recording density has become higher, with the FH value now reaching approximately 10 nanometers (nm). As the FH decreases, the sensitivity of PSA to hard errors increases. In other words, if the design of magnetic-recording head and magnetic-recording disk is changed, and FH is reduced in order to increase the storage capacity of products which are under development, then hard errors also occur in HDDs that previously passed the tilt-drop test without any problem, even if the test is performed under the same conditions. The issue addressed by embodiments of the present invention lies in providing a HDD with reduced FH that is still able to withstand the same tilt-drop test, as in the prior art.

Figure 5A:
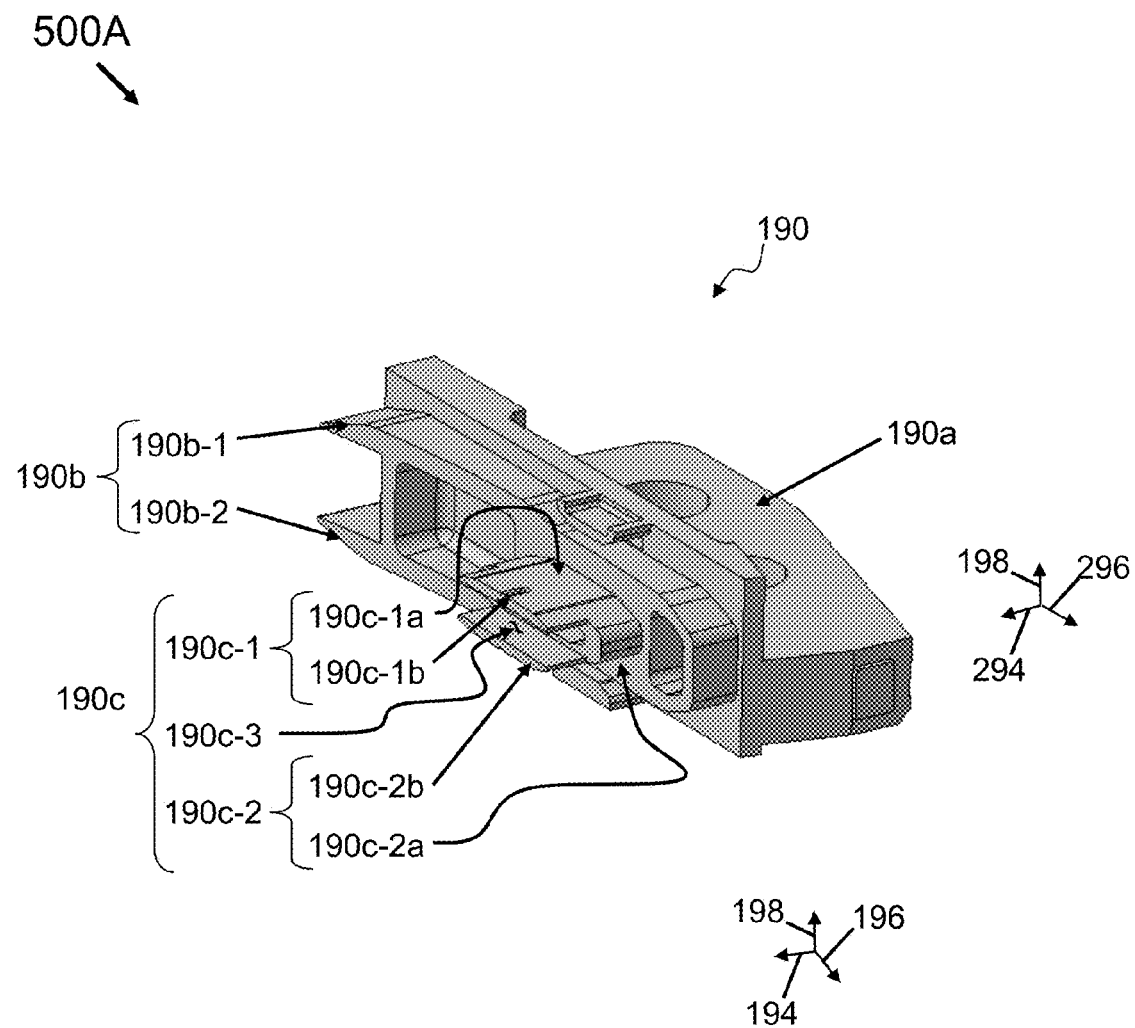
FIG. 5A is a perspective view of the L/UL ramp structure illustrating the arrangement of component parts of the L/UL ramp structure, in accordance with one or more embodiments of the present invention.
Figure 5B:
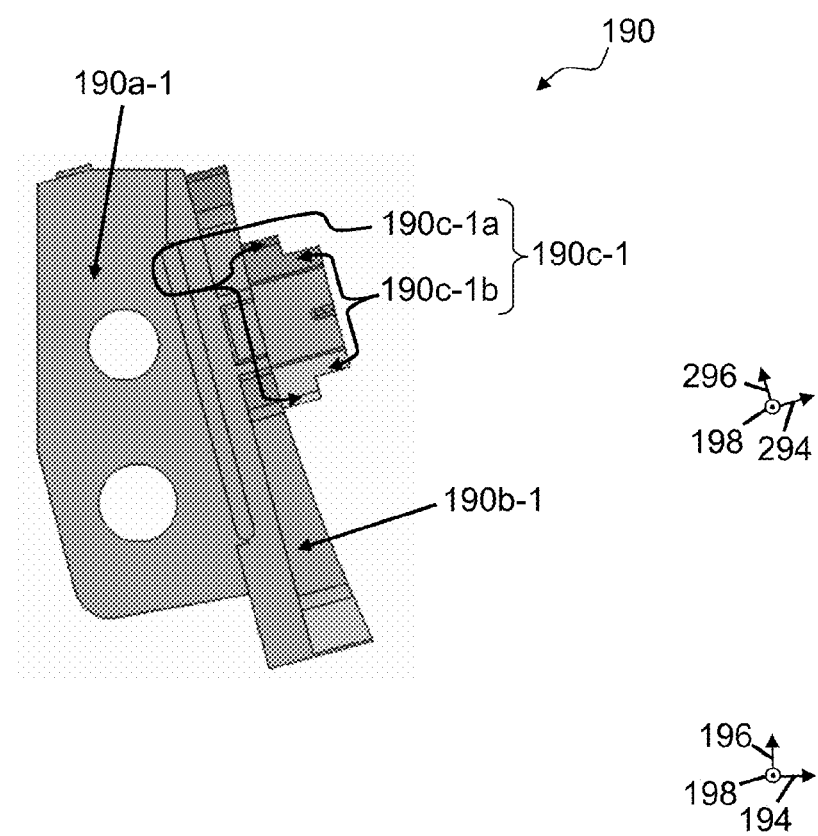
FIG. 5B is a plan view looking down onto the L/UL ramp structure illustrating the arrangement of component parts of the L/UL ramp structure, in accordance with one or more embodiments of the present invention.
Figure 5C:
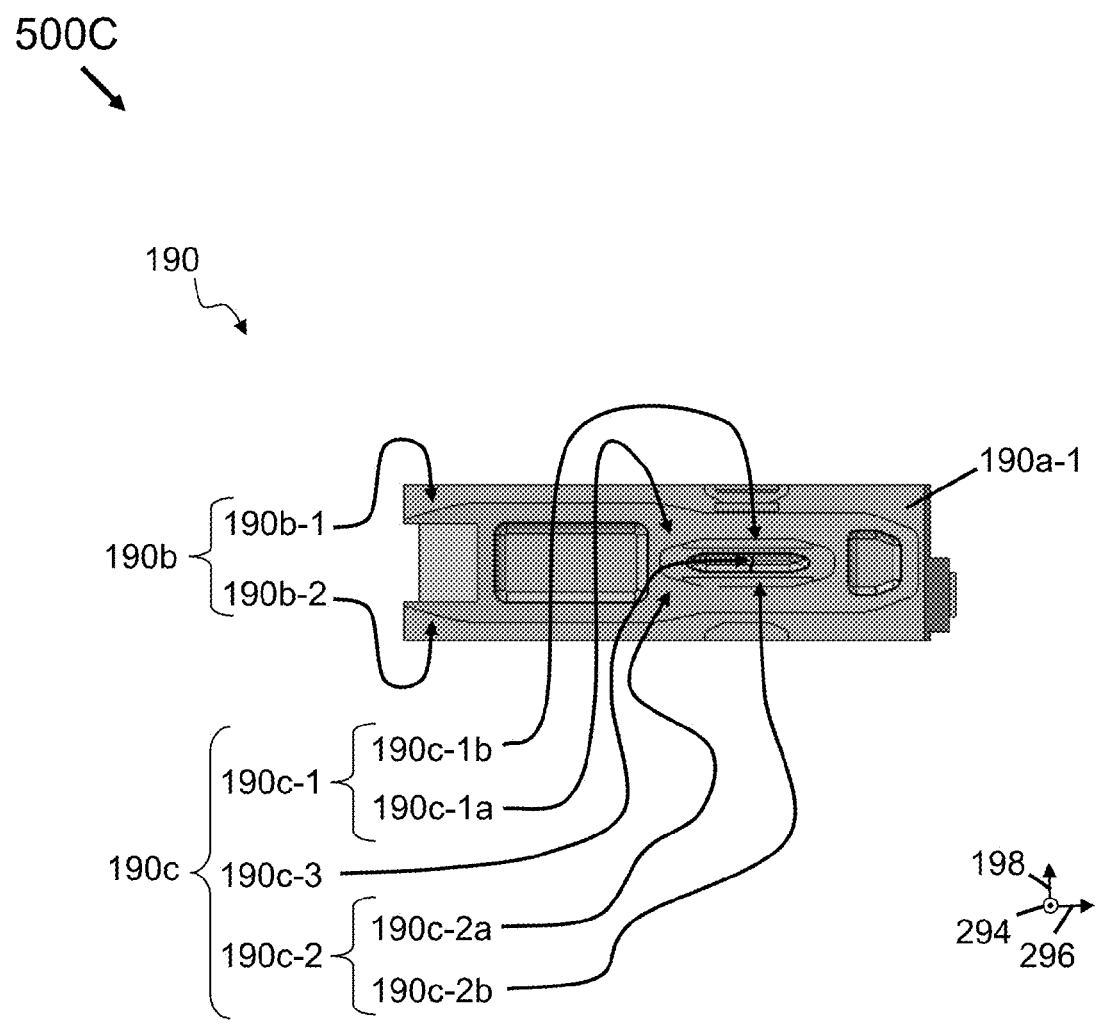
FIG. 5C is another plan view looking in about an upstream direction at an approximately downstream-facing side of the L/UL ramp structure illustrating the arrangement of component parts of the L/UL ramp structure, in accordance with one or more embodiments of the present invention.

With reference now to FIGS. 5A-5C, in accordance with one or more embodiments of the present invention, FIG. 5A is a perspective view 500A of the L/UL ramp structure 190; FIG. 5B is a plan view 500B looking down onto the L/UL ramp structure 190; and, FIG. 5C is another plan view 500C looking in about an upstream direction at an approximately downstream-facing side of the L/UL ramp structure 190. As shown in FIGS. 5A-5C, the triad of arrows 294, 296 and 198 indicates the orientation in which the L/UL ramp structure 190 is viewed in the perspective views 500A, 500B and 500C relative to the combined side and cross-sectional view 300 of FIG. 3 and the plan view 200 of FIG. 2. FIGS. 5A-5C show the arrangement of component parts of the L/UL ramp structure 190. As previously described above in the discussion of FIGS. 1-3, the L/UL ramp structure 190 includes a bracket portion 190a, a L/UL ramp portion 190b, and a fin 190c. The L/UL ramp portion 190b includes a first, or top, L/UL ramp 190b-1, and a second, or bottom, L/UL ramp 190b-2. As shown in FIGS. 5A-5C, the fin 190c includes a first, or top, fin base portion 190c-1a, a first, or top, cantilevered fin portion 190c-1b, a second, or bottom, fin base portion 190c-2a, and a second, or bottom, cantilevered fin portion 190c-2b. The fin base portion includes the first, or top, fin portion 190c-1, and the second, or bottom, fin portion 190c-2. The fin 190c is provided with a slit 190c-3 that defines the first cantilevered fin portion 190c-1b and the second cantilevered fin portion 190c-2b.

With further reference to FIGS. 5A-5C, in accordance with one or more embodiments of the present invention, the L/UL ramp structure 190 may further include a second L/UL ramp 190b-2, and a second cantilevered fin portion 190c-2b. The second L/UL ramp 190b-2 is configured to lift a second head-slider 310a and 310b away from a second, or bottom, recording surface of the magnetic-recording disk 120. The fin 190c is coupled to the second L/UL ramp 190b-2 and is disposed above a second parking position of the second head-slider 310a and 310b on the second L/UL ramp 190b-2. The fin 190c further includes a second cantilevered fin portion 190c-2b that is coupled to, and extends outward from, the fin base portion 190c-2a. The bracket portion 190a is integrally attached to the second L/UL ramp 190b-2. The second cantilevered fin portion 190c-2b is separated from the first cantilevered fin portion 190c-1b by the slit 190c-3.

Conventional magnetic-recording disks which are used in HDDs enable magnetic recording on both surfaces. A magnetic-recording head, similar to first magnetic-recording head 110a, is therefore disposed on each of the bottom surface and the top surface of a magnetic-recording disk, similar to magnetic-recording disk 120, and the two magnetic-recording heads, top and bottom, are used as a pair. An even number of magnetic-recording heads is therefore often used in an HDD.

From the point of view of designing the L/UL ramp structure 190, the attached structure has a single fin 190c for the two magnetic-recording heads, which form the top and bottom pair. This is because the top and bottom magnetic-recording heads are positioned very close together, so there is no space to provide two fins corresponding to each head.

Furthermore, the L/UL ramp structure 190 has a very complex shape so it is produced as a plastic molded article. The fin 190c is molded as a substantially elliptical cylinder including a planar region facing the top and bottom magnetic-recording heads. The fact that the fin 190c is cylindrical makes it possible to ensure precise component dimensions because the component is endowed with a uniform wall thickness.

Accordingly, it is the overall stiffness of the fin 190c of the L/UL ramp structure 190 that blocks head slap that occurs when the non-operating HDD is subjected to an external impact.

According to embodiments of the present invention, the stiffness of the fin 190c is adjusted by providing a slit 190c-3 in the fin 190c. The stiffness of the fin 190c can be adjusted by varying the width and depth of the slit 190c-3; and, therefore, it is possible to determine the shape of the slit 190c-3 with reference to the tilt-drop test results. The fin 190c is substantially divided into two portions, top and bottom, by providing the slit 190c-3. The portion of the fin 190c facing the top, or first, magnetic-recording head 110a on the upper side of the slit 190c-3 forms a single, first cantilevered fin portion 190c-1b from the base of the slit 190c-3 to the tip end of the fin 190c. As a result, the stiffness of the fin 190c is rather low compared with an arrangement in which the outer periphery of a fin without a slit 190c-3 is joined in the form of a tube. Thus, in accordance with embodiments of the present invention, by reducing the stiffness of a fin, as for fin 190c with reduced stiffness, it is possible to absorb head slap when an external impact is received due to bending of the fin 190c; and, variations in the PSA, ΔPSA, can be kept to a low level. As a result, it is possible to pass the tilt-drop test.

Moreover, the slit 190c-3 according to embodiments of the present invention can be formed in a simple manner by adjusting the shape of an insert pin, which is used for shaping the fin 190c, which is subsequently described, which is one component of the mold for forming the L/UL ramp structure 190. This means that there is a further advantage in that application of the present invention does not involve high costs.

By way of example, in accordance with embodiments of the present invention, in HDD 101, two magnetic-recording heads, top and bottom, 110a and 310a may be disposed at the respective top and bottom sides of a single magnetic-recording disk 120, without limitation thereto. The L/UL ramp structure 190, therefore, has one fin 190c. The fin 190c has a shape in which a slit 190c-3 in the lengthwise direction of the L/UL ramp portion 190b is formed in the cylindrical section of the fin 190c, which has a substantially elliptical in shape. The slit 190c-3 divides the fin 190c substantially into two cantilevers at the top and bottom, a first cantilevered fin portion 190c-1b and second cantilevered fin portion 190c-2b.

Specifically, the shape of the fin 190c in HDD 101 has a gap of approximately 1.3 millimeters (mm) at the surfaces where the top and bottom head-sliders 110a and 110b, and 310a and 310b, respectively, are received. Furthermore, the height of the fin 190c is approximately 2.1 mm; and, the wall thickness of the cylindrical part of the fin 190c is approximately 0.25 mm.

In order to impart a cylindrical shape to the fin 190c, the mold for shaping the L/UL ramp structure 190 has a rod-like molding component known as an insert pin which is inserted to around 2 mm in the center of the fin 190c (not depicted). By this means, a fin 190c having a uniform wall thickness is formed around the insert pin. The slit 190c-3, in one embodiment of the present invention, can be formed simply by changing the shape of the insert pin. That is, a protruding shape, which has the width and length of the slit 190c-3 to be formed, is made at the tip end of the insert pin (not depicted) of the die used in molding the L/UL ramp structure 190. The width and depth of the slit 190c-3 in the fin 190c can be adjusted by changing the protruding shape.

Figure 6:
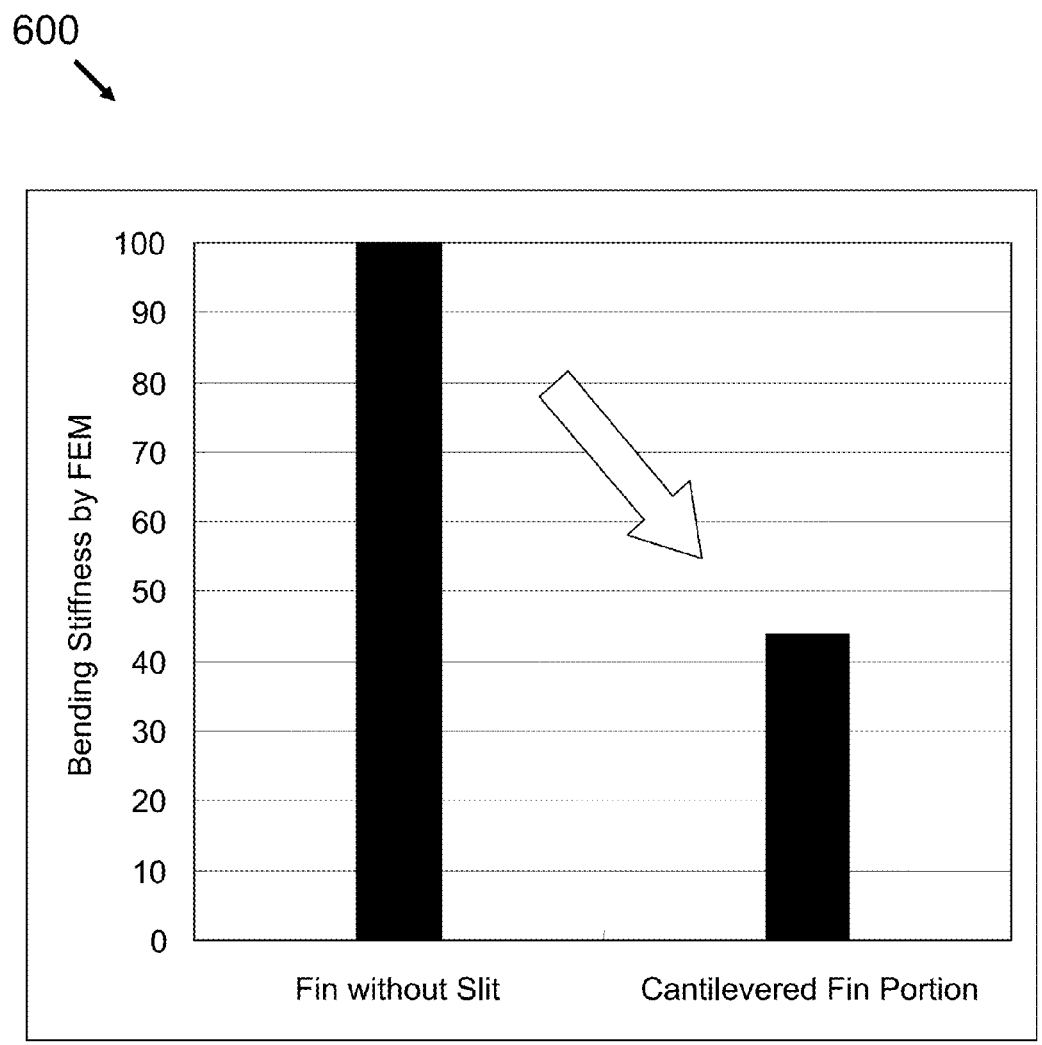
FIG. 6 is a chart comparing the stiffness of a cantilevered fin portion, in accordance with one or more embodiments of the present invention, to the stiffness of a substantially similar fin without the slit, as modeled with finite element modeling (FEM)

With now reference to FIG. 6, a chart is shown that compares the stiffness of a cantilevered fin portion, for example, first cantilevered fin portion 190c-1b, in accordance with one or more embodiments of the present invention, to the stiffness of a substantially similar fin without the slit 190c-3. As shown in FIG. 6, in accordance with embodiments of the present invention, substantially independent cantilever-shaped parts, first cantilevered fin portion 190c-1b and second cantilevered fin portion 190c-2b of the fin 190c facing each for the top and bottom head-sliders 110a and 110b, and 310a and 310b, respectively, are formed; and, the stiffness of the fin 190c is reduced by approximately 55% compared with a conventional fin without a slit 190c-3. Thus, in accordance with embodiments of the present invention, the first cantilevered fin portion 190c-1b and the second cantilevered fin portion 190c-2b have less stiffness than a stiffness of a substantially similar fin without the slit 190c-3.

Embodiments of the present invention are characterized in that the fin 190c of the L/UL ramp structure 190 used in HDD 101 is provided with a slit 190c-3; and, as a result, respective dedicated fins are substantially provided for each of the top and bottom magnetic-recording heads 110a and 110b, and 310a and 310b, respectively. Moreover, the stiffness of the fin 190c is adjusted by adjusting the shape of the slit 190c-3. As a result, it is possible to pass the tilt-drop test. The exemplary embodiment introduced above relates to an example in which the HDD 101 employs only one 3.5-inch magnetic-recording disk 120, but the present invention may of course be applied without limitation to HDDs employing a plurality of magnetic-recording disks, and to HDDs in which one or more 2.5-inch magnetic-recording disks are employed.

Figure 7:
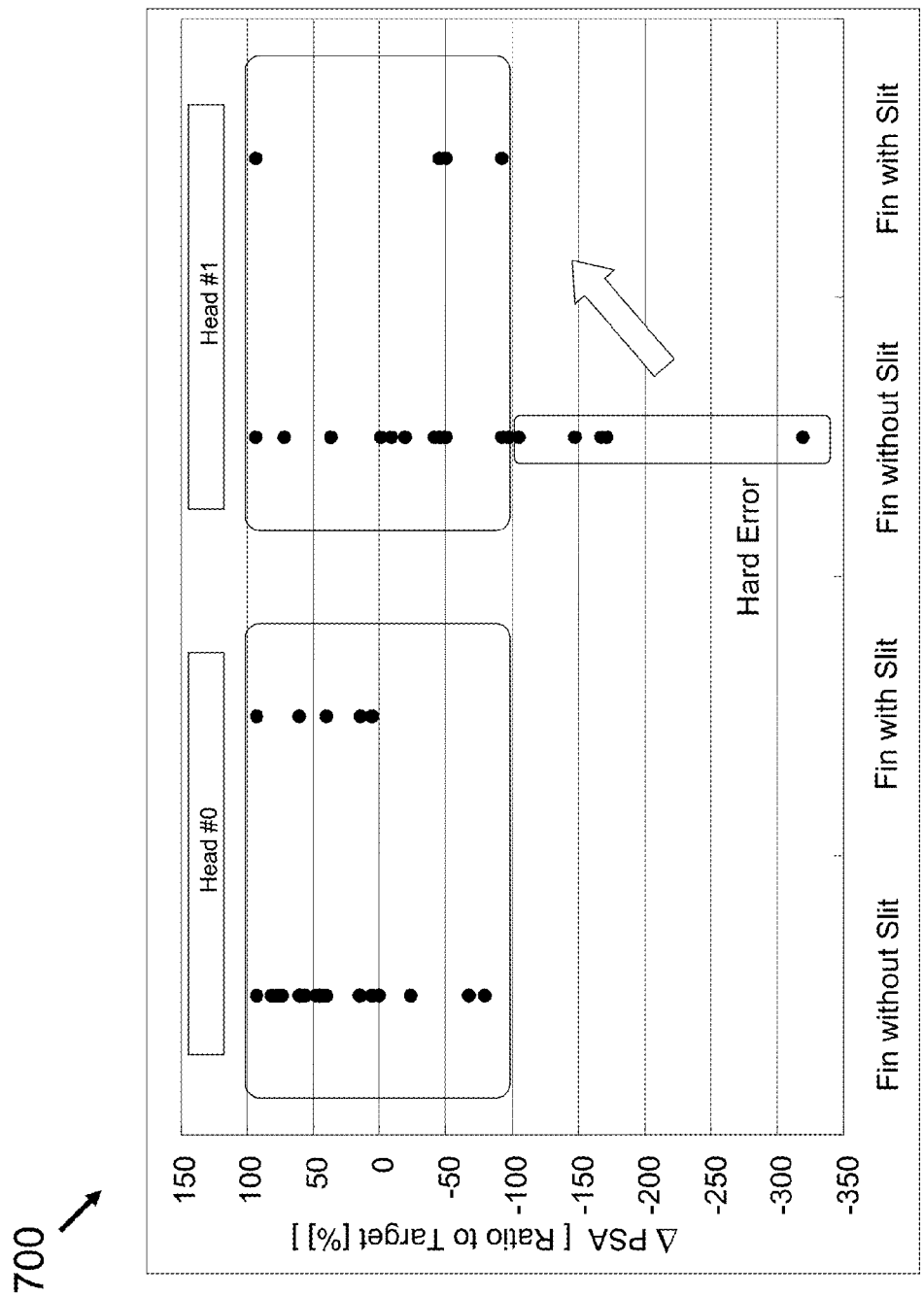
FIG. 7 is a chart comparing the change in pitch static angle (PSA), $\Delta$PSA, of the fin with the slit, in accordance with one or more embodiments of the present invention, to $\Delta$PSA of a substantially similar fin without the slit.

With now reference to FIG. 7, a chart is shown that compares the change in PSA, ΔPSA, of the fin 190c with the slit 190c-3, in accordance with one or more embodiments of the present invention, to ΔPSA of a substantially similar fin without the slit 190c-3. FIG. 7 shows the results of a tilt-drop test involving the abovementioned 3.5-inch HDD 101 in the case when a L/UL ramp structure 190 having a fin 190c with the slit 190c-3 according to embodiments of the present invention was used, and the case when a conventional L/UL ramp structure was used. The slit 190c-3 formed had a width of 0.8 mm and a depth of 1.0 mm. When a conventional L/UL ramp structure was used, hard errors occurred in all four HDDs which underwent the tilt-drop test, and the test could not be passed. Two of the four HDDs could no longer be started and data write errors occurred in head 1 in the other two HDDs.

The PSA change distribution was then investigated for the magnetic-recording heads which had been subjected to an external impact by means of the tilt-drop test. FIG. 7 shows the normalized PSA change amounts before and after the tilt-drop test. 0 indicates no change in the PSA before and after the test, and 100 indicates the PSA change amount at the boundary value where hard errors start to occur. That is, the change amount lies within the permitted range if it is within ±100, and hard errors do not arise in the HDD, so the tilt-drop test can be passed.

As a result, when a conventional L/UL ramp structure was used, the PSA change for the top magnetic-recording head (head 1), similar to first magnetic-recording head 110a, went beyond the permitted range. The PSA change distribution was broad in the case of the other magnetic-recording head, which was the bottom magnetic-recording head (head 0), similar to second magnetic-recording head 310a, but remained within the permitted range. Moreover, hard errors occurred in all head 1 type magnetic-recording heads, so it could be confirmed that hard errors occurred in the HDDs due to excessive change in the PSA.

On the other hand, when the L/UL ramp structure 190 having a fin 190c with the slit 190c-3 according to embodiments of the present invention was used, hard errors did not occur in any of the HDDs, which underwent the tilt-drop test;

and, the test could be passed. When the PSA change distribution after the tilt-drop test was investigated in the same way, it could be confirmed that the PSA change distribution range in both the top magnetic-recording heads (heads 1) and bottom magnetic-recording heads (heads 0) was less than for the HDDs having a L/UL ramp structure that included a fin without the slit 190c-3. The PSA change distribution in the top magnetic-recording heads (heads 1) was within the permitted range, so hard errors did not occur. Thus, in accordance with embodiments of the present invention, the first cantilevered fin portion 190c-1b and the second cantilevered fin portion 190c-2b are configured to reduce an occurrence of hard errors in HDD 101 after HDD 101 is dropped, compared with an occurrence of hard errors in a substantially identical HDD, but with a slitless fin, fin without a slit 190c-3, when the HDD with the slitless fin, fin without a slit 190c-3, is similarly dropped.

With now reference to FIG. 8, in accordance with one or more embodiments of the present invention, a flow chart 800 is shown of a method for providing protection from drop shock for at least one head-slider in a hard-disk drive. The method includes the following operations. At 810, fabricating a load-unload ramp structure is fabricated that includes a fin having a slit; the fin includes a first cantilevered fin portion and a second cantilevered fin portion defined by the slit in the fin. At 820, affixing a bracket portion of the load-unload ramp structure is affixed to a disk-enclosure base of the hard-disk drive. Thus, the load-unload ramp structure is affixed in a static position in a disk-enclosure base of the hard-disk drive. At 830, a head-gimbal assembly, which includes a head-slider of the hard-disk drive, is parked at a parking position on the load-unload ramp structure. The parking position is located adjacent to the first and second cantilevered fin portions such that the head-slider faces at least one of the first and second cantilevered fin portions when the head-gimbal assembly is parked at the parking position. At 840, fabricating the load-unload ramp structure may also include injection molding the load-unload ramp structure with a die that includes a protrusion into a cavity formed by the die to produce the slit in the fin at a location of the protrusion when the load-unload ramp structure is formed in the die.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A load-unload ramp structure with a cantilevered fin portion to reduce drop shock in a hard-disk drive, said load-unload ramp structure comprising:
   a first load-unload ramp configured to lift a first head-slider away from a first recording surface of a magnetic-recording disk;
   a fin coupled to said first load-unload ramp and disposed below a first parking position of said first head-slider on said first load-unload ramp, said fin comprising:
      a fin base portion; and
      a first cantilevered fin portion coupled to, and extending outward from, said fin base portion;
   a bracket portion integrally attached to said first load-unload ramp, and configured to allow affixing said load-unload ramp structure in a static position in a disk-enclosure base of said hard-disk drive;
   a second load-unload ramp configured to lift a second head-slider away from a second recording surface of said magnetic-recording disk;
   said fin coupled to said second load-unload ramp and disposed above a second parking position of said second head-slider on said second load-unload ramp, said fin further comprising:
      a second cantilevered fin portion coupled to, and extending outward from, said fin base portion; and
   wherein said bracket portion is integrally attached to said second load-unload ramp; and
   wherein said second cantilevered fin portion is separated from said first cantilevered fin portion by a slit.

2. The load-unload ramp structure of claim 1, wherein said first cantilevered fin portion is configured so that when said first head-slider is parked at said first parking position said first cantilevered fin portion is disposed facing a disk-facing side of said first head-slider.

3. The load-unload ramp structure of claim 1, wherein said first cantilevered fin portion is configured so that when said first head-slider is parked at said first parking position said first cantilevered fin portion is configured to prevent said first head-slider and a second head-slider from striking one another.

4. The load-unload ramp structure of claim 1, wherein said second cantilevered fin portion is configured so that when a second head-slider is parked at said second parking position said second cantilevered fin portion is disposed facing a disk-facing side of said second head-slider.

5. The load-unload ramp structure of claim 1, wherein said second cantilevered fin portion is configured so that when said second head-slider is parked at said second parking position said second cantilevered fin portion is configured to prevent said first head-slider and said second head-slider from striking one another.

6. The load-unload ramp structure of claim 1, wherein said first cantilevered fin portion and said second cantilevered fin portion are configured to reduce a change in pitch static angle of at least one of said first head-slider and said second head-slider when said hard-disk drive is dropped, compared to a change in pitch static angle of a first head-slider and a second head-slider of a substantially identical hard-disk drive, but with a slitless fin, when said substantially identical hard-disk drive is similarly dropped.

7. The load-unload ramp structure of claim 1, wherein said first cantilevered fin portion and said second cantilevered fin portion have less stiffness than a stiffness of a substantially similar fin without said slit.

8. The load-unload ramp structure of claim 1, wherein said first cantilevered fin portion and said second cantilevered fin portion are configured to reduce an occurrence of hard errors in said hard-disk drive after said hard-disk drive is dropped, compared with an occurrence of hard errors in a substantially identical hard-disk drive, but with a slitless fin, when said hard-disk drive with said slitless fin is similarly dropped.

9. A hard-disk drive having a load-unload ramp structure with a cantilevered fin portion to reduce drop shock, comprising:
   at least one magnetic-recording disk;
   at least one head-slider, said head-slider configured to access data on said magnetic recording disk;
   at least one magnetic-recording head disposed at a distal end of said head-slider, said magnetic-recording head configured to read data from, and to write data to, said magnetic-recording disk; and a load-unload ramp structure comprising:
- a first load-unload ramp configured to lift a first head-slider away from a first recording surface of said magnetic-recording disk;
- a fin coupled to said first load-unload ramp and disposed below a first parking position of said first head-slider on said first load-unload ramp, said fin comprising:
    - a fin base portion; and
    - a first cantilevered fin portion coupled to, and extending outward from, said fin base portion;
- a bracket portion integrally attached to said first load-unload ramp, and configured to allow affixing said load-unload ramp structure in a static position in a disk-enclosure base of said hard-disk drive;
- a second load-unload ramp configured to lift a second head-slider away from a second recording surface of said magnetic-recording disk;
- said fin coupled to said second load-unload ramp and disposed above a second parking position of said second head-slider on said second load-unload ramp, said fin further comprising:
    - a second cantilevered fin portion coupled to, and extending outward from, said fin base portion; and
- wherein said bracket portion is integrally attached to said second load-unload ramp; and
- wherein said second cantilevered fin portion is separated from said first cantilevered fin portion by a slit.

10. The hard-disk drive of claim 9, wherein said first cantilevered fin portion is configured so that when said first head-slider is parked at said first parking position said first cantilevered fin portion is disposed facing a disk-facing side of said first head-slider.

11. The hard-disk drive of claim 9, wherein said first cantilevered fin portion is configured so that when said first head-slider is parked at said first parking position said first cantilevered fin portion is configured to prevent said first head-slider and a second head-slider from striking one another.

12. The hard-disk drive of claim 9, wherein said wherein said second cantilevered fin portion is configured so that when a second head-slider is parked at said second parking position said second cantilevered fin portion is disposed facing a disk-facing side of said second head-slider.

13. The hard-disk drive of claim 9, wherein said second cantilevered fin portion is configured so that when said second head-slider is parked at said second parking position said second cantilevered fin portion is configured to prevent said first head-slider and said second head-slider from striking one another.

14. The hard-disk drive of claim 9, wherein said first cantilevered fin portion and said second cantilevered fin portion are configured to reduce a change in pitch static angle of at least one of said first head-slider and said second head-slider when said hard-disk drive is dropped, compared to a change in pitch static angle of a first head-slider and a second head-slider of a substantially identical hard-disk drive, but with a slitless fin, when said substantially identical hard-disk drive is similarly dropped.

15. The hard-disk drive of claim 9, wherein said first cantilevered fin portion and said second cantilevered fin portion have less stiffness than a stiffness of a substantially similar fin without said slit.

16. The hard-disk drive of claim 9, wherein said first cantilevered fin portion and said second cantilevered fin portion are configured to reduce an occurrence of hard errors in said hard-disk drive after said hard-disk drive is dropped, compared with an occurrence of hard errors in a substantially identical hard-disk drive, but with a slitless fin, when said hard-disk drive with said slitless fin is similarly dropped.

17. A method for providing protection from drop shock for at least one head-slider in a hard-disk drive, said method comprising:
- fabricating a load-unload ramp structure including a fin having a slit, said fin including a first cantilevered fin portion and a second cantilevered fin portion defined by said slit in said fin, wherein said fabricating said load-unload ramp structure further comprises injection molding said load-unload ramp structure with a die that includes a protrusion into a cavity formed by said die to produce said slit in said fin at a location of said protrusion when said load-unload ramp structure is formed in said die;
- affixing a bracket portion of said load-unload ramp structure to affix said load-unload ramp structure in a static position in a disk-enclosure base of said hard-disk drive; and
- parking a head-gimbal assembly including a head-slider of said hard-disk drive at a parking position on said load-unload ramp structure;
- wherein said parking position is located adjacent to said first and second cantilevered fin portions such that said head-slider faces at least one of said first and second cantilevered fin portions when said head-gimbal assembly is parked at said parking position.

* * * * *